No. 896,238. PATENTED AUG. 18, 1908.
J. L. PAUL.
CRUCIFIX HOLDER.
APPLICATION FILED JAN. 25, 1906.

WITNESSES:
J. J. Brophy

INVENTOR
John L. Paul
BY Munn & Co
ATTORNEYS

UNITED STATES PATENT OFFICE.

JOHN LAURENE PAUL, OF CHICAGO, ILLINOIS.

CRUCIFIX-HOLDER.

No. 896,238.            Specification of Letters Patent.            Patented Aug. 18, 1908.

Application filed January 25, 1906. Serial No. 297,871.

*To all whom it may concern:*

Be it known that I, JOHN LAURENE PAUL, a citizen of the United States, and a resident of Chicago, in the county of Cook and State of Illinois, have invented a new and Improved Crucifix-Holder, of which the following is a full, clear, and exact description.

This invention relates to improvements in crucifix holders, the object being to provide in connection with a casing, a cover therefor to which the corpus is secured, the connection between the casing and the cover being so constructed that the cover may be reversed to expose the corpus or to place the same within the casing, and thus out of sight.

I will describe a crucifix holder embodying my invention, and then point out the novel features in the appended claim.

Reference is to be had to the accompanying drawings, forming a part of this specification, in which similar characters of reference indicate corresponding parts in all the figures.

Figure 1:
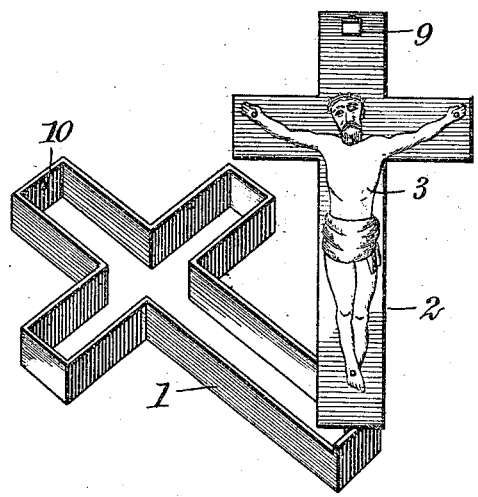
Figure 2:
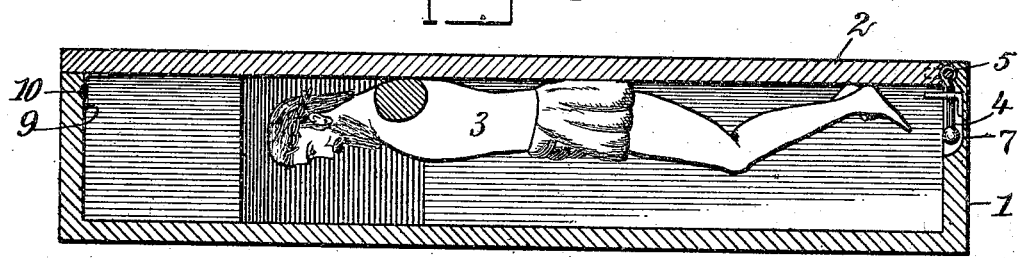
Figure 3:
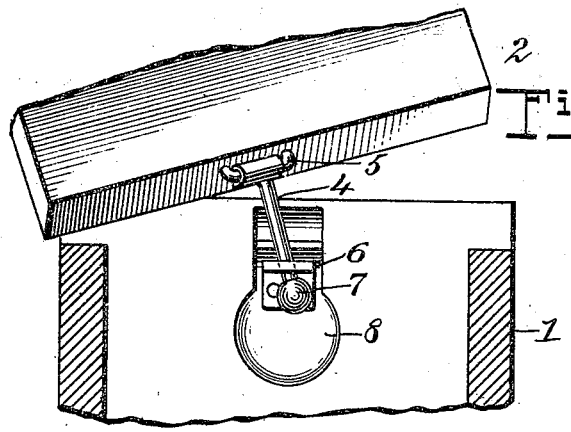
Figure 4:
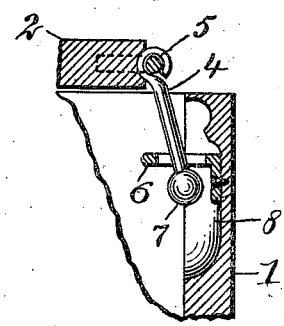
Figure 5:
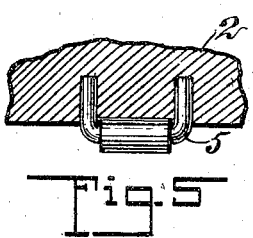

Figure 1 is a perspective view of a crucifix holder embodying my invention; Fig. 2 is a longitudinal section thereof; Fig. 3 is a sectional detail indicating the position of parts when the cover is open; Fig. 4 is a sectional detail illustrating the movement of the cover preparatory to opening; and Fig. 5 shows the hinged connection of the cover.

Referring to the drawing 1 designates the cruciform casing and 2 the cover therefor of corresponding shape, and to this cover is rigidly secured the corpus 3. The hinged connection between the cover 2 and the casing consists of a rod 4 having swinging connection with a staple 5 arranged in one end of the cover; and this rod 4 passes through a slot in a bracket 6 attached to the inner side of the adjacent end of the casing, and to prevent the rod from being wholly removed from the bracket, the said rod is provided at its end with an enlargement or ball 7.

To permit the free movement of the ball when the cover is to be opened and closed, the end of the casing in which the bracket is arranged is provided with a recess 8. Any suitable means can be provided for holding the cover in closed position; I have here shown a spring clip 9 at the free end of the cover, provided with a knob on one side that enters a socket 10 formed in the inner side of the casing when the cover is closed.

The operation is quite obvious from the drawings; that is, when it is desired to disclose the corpus, the free end of the cover is to be drawn upward to release the fastening and then the said cover may be rocked into any desired position, relative to the casing.

Having thus described my invention I claim as new, and desire to secure by Letters Patent.

A crucifix holder comprising a cruciform casing, a correspondingly-shaped cover, one end wall of said casing being interiorly recessed, a slotted bracket arranged in said recess, and a rod having swinging connection with the cover and passing through the slot in said bracket and adapted to turn axially therein, the said rod having an enlarged end.

In testimony whereof I have signed my name to this specification in the presence of two subscribing witnesses.

JOHN LAURENE PAUL.

Witnesses:
    LUCIEN E. DODEZ,
    MARY L. DODEZ.